United States Patent
Liu et al.

(10) Patent No.: US 11,970,589 B2
(45) Date of Patent: Apr. 30, 2024

(54) COMPOSITE PROTON CONDUCTIVE MEMBRANES

(71) Applicant: UOP LLC, Des Plaines, IL (US)

(72) Inventors: Chunqing Liu, Arlington Heights, IL (US); Xueliang Dong, Schaumburg, IL (US); Chaoyi Ba, Schaumburg, IL (US)

(73) Assignee: UOP LLC, Des Plaines, IL (US)

( * ) Notice: Subject to any disclaimer, the term of this patent is extended or adjusted under 35 U.S.C. 154(b) by 506 days.

(21) Appl. No.: 17/162,421

(22) Filed: Jan. 29, 2021

(65) Prior Publication Data

US 2022/0243019 A1    Aug. 4, 2022

(51) Int. Cl.
  *C08J 5/22*  (2006.01)
  *C08K 3/36*  (2006.01)
  *H01M 8/1069*  (2016.01)

(52) U.S. Cl.
  CPC .......... *C08J 5/2225* (2013.01); *C08K 3/36* (2013.01); *H01M 8/1069* (2013.01); *C08J 2205/042* (2013.01); *C08J 2205/044* (2013.01)

(58) Field of Classification Search
  CPC ............ C08J 5/2225; C08J 2205/042; C08J 2205/044; C08K 3/36; H01M 3/36
  USPC ........................................................ 521/27
  See application file for complete search history.

(56) References Cited

U.S. PATENT DOCUMENTS

| | | | |
|---|---|---|---|
| 10,177,361 B2 * | 1/2019 | Hasegawa | H01M 50/457 |
| 11,165,068 B2 * | 11/2021 | Tamaki | H01M 8/1039 |
| 2005/0053818 A1 * | 3/2005 | St-Arnaud | C08J 5/2256 429/493 |
| 2015/0140439 A1 * | 5/2015 | Hasegawa | H01M 50/451 524/45 |
| 2017/0317370 A1 * | 11/2017 | Kang | C08J 5/2262 |
| 2020/0052308 A1 * | 2/2020 | Tamaki | B01D 69/107 |
| 2020/0330929 A1 | 10/2020 | Wang et al. | |

FOREIGN PATENT DOCUMENTS

| | | | | |
|---|---|---|---|---|
| CN | 108987774 A | * | 12/2018 | .......... H01M 8/1048 |
| CN | 109768308 A | * | 5/2019 | |
| WO | 2018/185615 A1 | | 10/2018 | |
| WO | 2020033460 A1 | | 2/2020 | |
| WO | WO-2020033460 A1 | * | 2/2020 | ............. B01D 69/10 |
| WO | 2020/240585 A1 | | 12/2020 | |

OTHER PUBLICATIONS

Search Report and Written Opinion for PCT/US2022/070312 dated Apr. 21, 2022.

* cited by examiner

*Primary Examiner* — Michael M. Bernshteyn
(74) *Attorney, Agent, or Firm* — Paschall & Associates, LLC; Mark Goldberg

(57) ABSTRACT

A composite proton conductive membrane, comprising an inorganic filler having covalently bonded acidic functional groups and a high surface area of at least 150 m²/g; and a water insoluble ionically conductive polymer. This membrane provides advantages over traditional polymeric proton conductive membranes for redox flow battery, fuel cell, and electrolysis applications include: 1) enhanced proton conductivity/permeance due to the formation of additional nanochannels for proton conducting; 2) improved proton/electrolyte selectivity for redox flow battery application; 3) reduced membrane swelling and gas or electrolyte crossover; 4) improved chemical stability; 5) increased cell operation time with stable performance, and 6) reduced membrane cost.

13 Claims, 1 Drawing Sheet

COMPOSITE PROTON CONDUCTIVE MEMBRANES

BACKGROUND OF THE INVENTION

Energy storage systems have played a key role in harvesting energy from various sources. These energy storage systems can be used to store energy and convert it for use in many different applications, such as building, transportation, utility, and industry. A variety of energy storage systems have been used commercially and new systems are currently being developed. Types of energy storage systems can be categorized as electrochemical and battery, thermal, thermochemical, flywheel, compressed air, pumped hydropower, magnetic, biological, chemical and hydrogen energy storage. The development of cost-effective and eco-friendly energy storage systems is needed to solve the energy crisis and to overcome the mismatch between generation and end use.

Renewable energy sources, such as wind and solar power, have transient characteristics, which require energy storage. Renewable energy storage systems such as redox flow batteries (RFBs) have attracted significant attention for electricity grid, electric vehicles, and other large-scale stationary applications. RFB is an electrochemical energy storage system that reversibly converts chemical energy directly to electricity. The conversion of electricity via water electrolysis into hydrogen as an energy carrier without generation of carbon monoxide or dioxide as byproducts enables a coupling of the electricity, chemical, mobility, and heating sectors. Hydrogen as an energy vector for grid balancing or power-to-gas and power-to-liquid processes plays an important role in the path toward a low-carbon energy structure that is environmentally friendly. Water electrolysis produces high quality hydrogen by electrochemical splitting of water into hydrogen and oxygen; the reaction is given by Eq. 1 below. The water electrolysis process is an endothermic process and electricity is the energy source. Water electrolysis has zero carbon footprint when the process is operated by renewable power sources, such as wind, solar, or geothermal energy. The main water electrolysis technologies include alkaline electrolysis, proton exchange membrane (PEM) electrolysis, anion exchange membrane (AEM) electrolysis, and solid oxide electrolysis. In the PEM water electrolysis system, an anode and a cathode are separated by a solid PEM electrolyte such as a sulfonated tetrafluoroethylene based fluorpolymer copolymer sold under the trademark Nafion® by Chemours company. The anode and cathode catalysts typically comprise $IrO_2$ and Pt, respectively. At the positively charged anode, pure water is oxidized to produce oxygen gas, electrons (e), and protons; the reaction is given by Eq. 2. The protons are transported from the anode to the cathode through the PEM that conducts protons. At the negatively charged cathode, a reduction reaction takes place with electrons from the cathode being given to protons to form hydrogen gas; the reaction is given by Eq. 3. The PEM not only conducts protons from the anode to the cathode, but also separates the $H_2$ and $O_2$ produced in the water electrolysis reaction. PEM water electrolysis is one of the favorable methods for conversion of renewable energy to high purity hydrogen with the advantage of compact system design at high differential pressures, high current density, high efficiency, fast response, small footprint, lower temperature (20-90° C.) operation, and high purity oxygen byproduct. However, one of the major challenges for PEM water electrolysis is the high capital cost of the cell stack comprising expensive acid-tolerant stack hardware, expensive noble metal catalysts required for the electrodes, as well as the expensive PEM.

$$\text{Water electrolysis reaction: } 2H_2O \rightarrow 2H_2 + O_2 \quad (1)$$

$$\text{Oxidation reaction at anode: } 2H_2O \rightarrow O_2 + 4H^+ + 4e^- \quad (2)$$

$$\text{Reduction reaction at cathode: } 2H^+ + 2e^- \rightarrow H_2 \quad (3)$$

Fuel cells, as a next generation clean energy resource, convert the energy of chemical reactions such as an oxidation/reduction redox reaction of hydrogen and oxygen into electric energy. Three main types of fuel cells are alkaline electrolyte fuel cells, polymer electrolyte membrane fuel cells, and solid oxide fuel cells. Polymer electrolyte membrane fuel cells may include proton exchange membrane fuel cells (PEMFC), anion exchange membrane fuel cells (AEMFC), and direct methanol fuel cells.

The anode in an electrochemical cell is the electrode at which the predominant reaction is oxidation (e.g., the water oxidation/oxygen evolution reaction electrode for a water or $CO_2$ electrolyzer, or the hydrogen oxidation electrode for a fuel cell).

Significant advances are needed in cost-effective catalysts, membrane materials, as well as other cell stack components for PEM water electrolysis and PEMFCs with a wide range of applications in renewable energy systems.

RFBs are composed of two external storage tanks filled with active materials comprising metal ions that may be in different valance states, two circulation pumps, and a flow cell with a separation membrane. The separation membrane is located between the anode and the cathode and is used to separate the anolyte and the catholyte, as well as to utilize the current circuit by allowing the transfer of balancing ions. The anolyte, catholyte, anode, and cathode may also be referred to as plating electrolyte or negative electrolyte, redox electrolyte or positive electrolyte, plating electrode or negative electrode, and redox electrode or positive electrode respectively. Among all the redox flow batteries developed to date, all vanadium redox flow batteries (VRFB) have been the most extensively studied. VRFB uses the same vanadium element in both half cells which prevents crossover contamination of electrolytes from one half cell to the other half cell. VRFB, however, is inherently expensive due to the use of high-cost vanadium and an expensive membrane. All-iron redox flow batteries (IFB) are particularly attractive for grid scale storage applications due to the use of low cost and abundantly available iron, salt, and water as the electrolyte and the non-toxic nature of the system. IFBs have iron in different valence states as both the positive and negative electrolytes for the positive and negative electrodes, respectively. The iron-based positive and negative electrolyte solutions stored in the external storage tanks flow through the stacks of the batteries. The cathode side half-cell reaction involves the deposition and dissolution of iron in the form of a solid plate; the reaction is given by Eq. 4. The anode side half-cell reaction involves $Fe^{2+}$ losing electrons to form $Fe^{3+}$ during charge and $Fe^{3+}$ gaining electrons to form $Fe^{2+}$ during discharge; the reaction is given by Eq. 5. The overall reaction is shown in Eq. 6.

$$\text{Redox electrode: } 2Fe^{2+} \leftrightarrow Fe^{3+} + 2e^- + 0.77V \quad (4)$$

$$\text{Plating electrode: } Fe^{2+} + 2e^- \leftrightarrow Fe^0 - 0.44V \quad (5)$$

$$\text{Total: } 3Fe^{2+} \leftrightarrow Fe^0 + 2Fe^{3+} 1.21V \quad (6)$$

The membrane is one of the key materials that make up a battery or electrolysis cell as a key driver for safety and performance. Some important properties for membranes for flow batteries, fuel cells, and membrane electrolysis include high conductivity, high ionic permeability (porosity, pore size and pore size distribution), high ionic exchange capacity (for ion-exchange membrane), high ionic/electrolyte selectivity (low permeability/crossover to electrolytes), low price (less than $150-200/m$^2$), low area resistance to minimize efficiency loss resulting from ohmic polarization, high resistance to oxidizing and reducing conditions, chemically inert to a wide pH range, high thermal stability together with high proton conductivity (greater than or equal to 120° C. for fuel cell), high proton conductivity at high T without $H_2O$, high proton conductivity at high T with maintained high RH, and high mechanical strength (thickness, low swelling).

The two main types of membranes for redox flow battery, fuel cell, and electrolysis applications are polymeric ion-exchange membranes and microporous separators. The polymeric ion-exchange membranes can be cation-exchange membranes comprising —$SO_3^-$, —$COO^-$, —$PO_3^{2-}$ —$PO_3H^-$, or —$C_6H_4O^-$ cation exchange functional groups, anion-exchange membranes comprising —$NH_3^+$, —$NRH_2^+$, —$NR_2H^+$, —$NR_3^+$, or —$SR_2^-$ anion exchange functional groups, or bipolar membranes comprising both cation-exchange and anion-exchange polymers. The polymers for the preparation of ion-exchange membranes can be perfluorinated ionomers such as Nafion®, Flemion®, and NEOSEPTA®-F, partially fluorinated polymers, non-fluorinated hydrocarbon polymers, non-fluorinated polymers with aromatic backbone, or acid-base blends. In general, perfluorosulfonic acid (PFSA)-based membranes, such as Nafion® and Flemion®, are used in vanadium redox flow battery (VRFB) systems due to their oxidation stability, good ion conductivity, unique morphology, mechanical strength, and high electrochemical performance. However, these membranes have low balancing ions/electrolyte metal ion selectivity, and high electrolyte metal ion crossover which causes capacity decay in VRFBs, and they are expensive.

The microporous and nanoporous membrane separators can be inert microporous/nanoporous polymeric membrane separators, inert non-woven porous films, or polymer/inorganic material coated/impregnated separators. The inert microporous/nanoporous polymeric membrane separators can be microporous polyethylene (PE), polypropylene (PP), PE/PP, or composite inorganic/PE/PP membrane, inert non-woven porous films, non-woven PE, PP, polyamide (PA), polytetrafluoroethylene (PTFE), polyvinyl chloride (PVC), polyethylene terephalate (PET), or polyester porous film. For example, microporous Daramic® and Celgard® membrane separators made from PE, PP, or blends of PE and PP polymers are commercially available. They normally have high ionic conductivity, but also high electrolyte cross-over for RFB applications.

Despite significant research efforts, there is a need for a reliable, high-performance (low gas crossover and excellent conductivity), low-cost membrane for electrochemical conversion and storage applications such as redox flow battery, fuel cell, and electrolysis applications.

DESCRIPTION OF THE INVENTION

Figure 1:
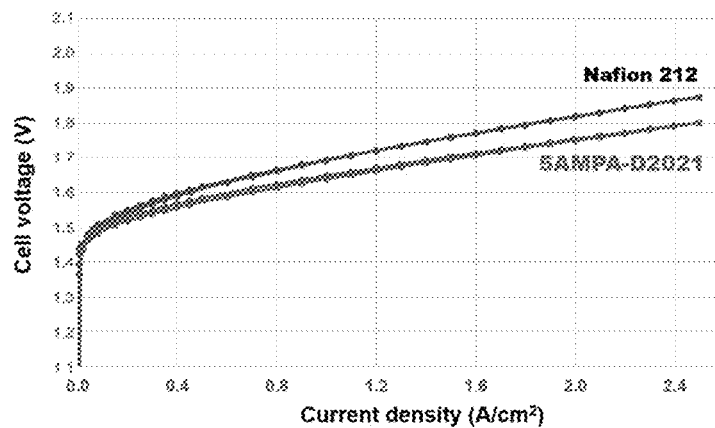
FIG. 1 shows water electrolysis performance of 5AMPA-D2021 and Nafion® 212 MEAs at 80° C., atmospheric pressure.

Most electrochemical conversion and storage systems, such as electrolyzers, fuel cells, and redox flow batteries, rely on the stable, high performance of ion conducting membranes. These systems cannot have the desired long term performance if the membrane cannot efficiently separate the electrochemically active species (e.g., the electrodes, the electrolytes) and the products and byproducts (e.g., oxygen and hydrogen), as well as conduct the specific ions (e.g., protons and supporting non-electrochemically active electrolyte cations) to mediate the electrochemical reactions taking place at the anode and cathode.

The present invention provides a new type of composite proton conductive membrane, and more particularly to a new composite proton conductive membrane comprising an inorganic filler having covalently bonded acidic functional groups and a high surface area of at least 150 m$^2$/g, or at least 300 m$^2$/g, or at least 400 m$^2$/g, a water insoluble ionically conductive polymer, and optionally a microporous support membrane. The new composite proton conductive membrane can be used in electrochemical energy systems such as electrolyzers, fuel cells, and redox flow batteries. Other aspects include methods of making the membrane, and a membrane electrode assembly for a water electrolysis or a fuel cell system, as well as a redox flow battery system incorporating the composite proton conductive membrane.

The incorporation of the inorganic filler having covalently bonded acidic functional groups and a high surface area of at least 150 m$^2$/g into the water insoluble ionically conductive polymer provided a new type of composite proton conductive membrane with some additional nanochannels having acidic proton conducting functional groups for proton conducting and good adhesion between the inorganic fillers and the water insoluble ionically conductive polymer matrix. The thickness of the composite proton conductive membrane is typically in a range of about 5 micrometer to about 500 micrometers, or in a range of about 20 micrometers to about 300 micrometers, or in a range of about 20 micrometers to about 200 micrometers. The inorganic fillers are dispersed in the water insoluble ionically conductive polymer matrix to form a composite proton conductive dense nonporous membrane.

The advantages of the new composite proton conductive membrane comprising inorganic fillers having covalently bonded acidic functional groups and a high surface area of at least 150 m$^2$/g over the traditional polymeric proton conductive membranes such as Nafion® and Flemion® for redox flow battery, fuel cell, and electrolysis applications include: 1) enhanced proton conductivity/permeance due to the formation of additional nanochannels for proton conducting; 2) improved proton/electrolyte selectivity for redox flow batteries; 3) reduced membrane swelling and gas or electrolyte crossover; 4) improved chemical stability; 5) increased cell operation time with stable performance, and 6) reduced membrane cost.

The new composite proton conductive membrane comprising an inorganic filler having covalently bonded acidic functional groups and a high surface area of at least 150 m$^2$/g, a water insoluble ionically conductive polymer, and optionally a microporous support membrane for redox flow battery, fuel cell, and electrolysis applications has high ionic conductivity and can transport the charge-carrying ions, such as protons or/and potassium cations ($K^+$), from one side of the membrane to the other side of the membrane to maintain the electric circuit. The electrical balance is achieved by the transport of charge-carrying ions (such as protons in PEM water electrolysis, protons, potassium cations, ammonium cations, or sodium cations in all iron redox flow battery system) across the composite proton conductive membrane during the operation of the electrochemical cell. The ionic conductivity (σ) of the membrane is a measure of its ability to conduct charge-carrying ions, and the measurement unit for conductivity is Siemens per meter (S/m). The ionic conductivity (σ) of the composite proton conductive membrane can be measured by determining the resistance (R) of the membrane between two electrodes separated by a fixed distance. The resistance can be determined by electrochemical impedance spectroscopy (EIS) and the measurement unit for the resistance is Ohm (Ω). The membrane area specific resistance (RA) is the product of the resistance of the membrane (R) and the membrane active area (A) and the measurement unit for the membrane area specific resistance is (Ω·cm$^2$). The membrane ionic conductivity (σ, S/cm) is proportional to the membrane thickness (L, cm) and inversely proportional to the membrane area specific resistance (RA, Ω·cm$^2$).

The performance of the composite proton conductive membrane for RFB applications can be evaluated by several parameters including membrane solubility and stability in the electrolytes, area specific resistance, numbers of battery charge/discharge cycling, electrolyte crossover through the membrane, voltage efficiency (VE), coulombic efficiency (CE), and energy efficiency (EE) of the RFB cell. CE is the ratio of a cell's discharge capacity divided by its charge capacity. A higher CE, indicating a lower capacity loss, is mainly due to the lower rate of crossover of electrolyte ions, such as ferric and ferrous ions, in the iron redox flow battery system. VE is defined as the ratio of a cell's mean discharge voltage divided by its mean charge voltage (See M. Skyllas-Kazacos, C. Menictas, and T. Lim, Chapter 12 on Redox Flow Batteries for Medium- to Large-Scale Energy Storage in *Electricity Transmission, Distribution and Storage Systems*, A volume in Woodhead Publishing Series in Energy, 2013). A higher VE, indicating a higher ionic conductivity, is mainly due to the low area specific resistance of the membrane. EE is the product of VE and CE and is an indicator of energy loss in charge-discharge processes. EE is a key parameter to evaluate an energy storage system.

The performance of the composite proton conductive membrane for water electrolysis applications is evaluated by the polarization voltage (overall electrolysis cell voltage), high frequency resistance (HFR), and gas crossover. The polarization voltage ($E_{cell}$) is given in Eq. 7, wherein $E_{rev}$ is the reversible cell voltage, which is a function of temperature and pressure, and i is the current. $R_{memb}$, $R_e$ and $R_{H+}$ are the Ohmic resistance of the membrane, the electrical contact resistance, and effective proton transport resistance in the electrodes respectively. $\eta_{HER}$ and $\eta_{OER}$ are the kinetic overpotentials for the hydrogen evolution reaction (HER) and the oxygen evolution reaction (OER), $\eta_{mt}$ describes additional resistance related to mass transport (*J Electrochem. Soc.* 2016, 163, F3179). The high frequency resistance (HFR) equals to $R_{memb}+R_e+R_{H+}$, therefore, a lower HFR usually indicates a higher conductivity of the membrane. Gas (e.g., hydrogen and oxygen for water electrolyzer) crossover is a parameter to evaluate the hydrogen and oxygen permeability of the membrane under the water electrolysis conditions. For energy efficiency and safety consideration, low gas crossover (especially hydrogen crossover) is preferred. The performance of PEM electrolyzer cells or PEMFCs comprising the composite proton conductive membrane and commercially available proton exchange membrane, respectively, can be compared by their polarization curves, which is obtained by plotting the polarization voltage against the current density. Conversely to the PEM fuel cell, the better the PEM electrolyzer, the lower the cell voltage at a given current density in the polarization curve.

$$\text{Polarization voltage equation: } E_{cell}=E_{rev}+i\cdot(R_{memb}+R_e+R_{H+})+\eta_{HER}+\eta_{OER}+\eta_{mt} \quad (7)$$

The inorganic filler having covalently bonded acidic functional groups and a high surface area of at least 150 m$^2$/g, or at least 300 m$^2$/g, or at least 400 m$^2$/g, in the new composite proton conductive membrane may be selected from, but is not limited to, silica gel, precipitated silica, fumed silica, colloidal silica, alumina, silica-alumina, zirconium oxide, molecular sieve, metal-organic framework, zeolitic imidazolate framework, covalent organic framework, or a combination thereof, and wherein the filler comprises both covalently bonded acidic functional groups and a high surface area of 150 m$^2$/g or higher, or 300 m$^2$/g or higher, or 400 m$^2$/g or higher. Molecular sieves have framework structures which may be characterized by distinctive wide-angle X-ray diffraction patterns. Zeolites are a subclass of molecular sieves based on an aluminosilicate composition. Non-zeolitic molecular sieves are based on other compositions such as aluminophosphates, silico-aluminophosphates, and silica. Molecular sieves can have different chemical compositions and different framework structure. The molecular sieves can be microporous or mesoporous molecular sieves and need to be stable in aqueous solution under pH of less than 6. The acidic functional groups covalently bonded to the inorganic fillers may be selected from, but are not limited to, —H$_2$PO$_3$, —R—H$_2$PO$_3$, —SO$_3$H, —R—SO$_3$H, —COOH, —R—COOH, —C$_6$H$_5$OH, —R—C$_6$H$_5$OH, or a combination thereof, wherein R represents a linear alkyl group, a branched alkyl group, a cycloalkyl group, an organoamino group, an acid group-substituted organoamino group, or an aryl group and the number of carbon atoms in these groups is preferably 1 to 20, more preferably 1 to 10. The inorganic fillers may be in the form of, but are not limited to, particles, fine beads, thin plates, rods, or fibers. The size of the inorganic filler is in a range of about 2 nm to about 200 μm, or in a range of about 10 nm to about 100 μm, or in a range of about 50 nm to about 80 μm. The weight ratio of the inorganic fillers to the water insoluble ionically conductive polymer in the composite proton conductive membrane is in a range of 1/400 to 40/100, or in a range of 1/200 to 25/100, or in a range of 1/100 to 10/100.

In some embodiments, the inorganic filler is aminopropyl-N,N-bis(methyl phosphonic acid)-functionalized silica gel such as SilicaMetS® AMPA, aminopropyl-N,N-bis(methyl phosphonic acid)-functionalized fumed silica, n-propyl phosphonic acid-functionalized silica gel, n-propyl phosphonic acid-functionalized fumed silica, p-toluenesulfonic acid-functionalized silica gel, p-toluenesulfonic acid-functionalized fumed silica, 4-ethylbenzenesulfonic acid-functionalized silica gel such as SilicaBond® Tosic Acid, 4-ethylbenzenesulfonic acid-functionalized fumed silica, n-propyl sulfonic acid-functionalized silica gel, n-propyl sulfonic acid-functionalized fumed silica, or combinations thereof.

The water insoluble ionically conductive polymer in the new composite proton conductive membrane may be selected from, but is not limited to, a perfluorinated ionomer selected from, but is not limited to, Nafion®, Flemion®, Aquivion®, Aciplex®, NEOSEPTA®-F, Fumapem®, BAM®, a cross-linked perfluorinated cation-exchange polymer, a partially fluorinated cation-exchange polymer, a cross-linked partially fluorinated cation-exchange polymer, a non-fluorinated hydrocarbon cation-exchange polymer, a cross-linked non-fluorinated hydrocarbon cation-exchange polymer, or combinations thereof.

In some embodiments, the water insoluble ionically conductive polymer is Nafion®, Flemion®, Aquivion®, Aciplex®, NEOSEPTA®-F, Fumapem®, BAM®, sulfonated polysulfone, cross-linked sulfonated polysulfone, sulfonated poly(phenylene sulfone), sulfonated phenylated poly(phenylene), sulfonated polystyrene, sulfonated trifluorostyrene-trifluorostyrene copolymer, sulfonated polystyrene-poly(vinylidene fluoride) copolymer, sulfonated polyethersulfone, cross-linked sulfonated polyethersulfone, sulfonated polyether ether ketone, cross-linked sulfonated polyether ether ketone, or combinations thereof.

The water insoluble ionically conductive polymer in the new composite proton conductive membrane also may be selected from, but is not limited to, a water insoluble hydrophilic polymer or a water insoluble hydrophilic polymer complex comprising repeat units of both electrically neutral repeating units and a fraction of ionized functional groups such as $-SO_3^-$, $-COO^-$, $-PO_3^{2-}$, $-PO_3H^-$, $-C_6H_4O^-$, or $-O_4B^-$. The water insoluble hydrophilic polymer is insoluble in water but contains high water affinity polar or charged functional groups such as $-SO_3^-$, $-COO^-$, $-PO_3^{2-}$, or $-PO_3H^-$ group. The water insoluble hydrophilic polymer complex comprises a water insoluble hydrophilic polymer complexed with a complexing agent such as polyphosphoric acid, boric acid, a metal ion, or a mixture thereof. The water insoluble hydrophilic ionomeric polymer not only has high stability in an aqueous solution due to its insolubility in water, but also has high affinity to water and charge-carrying ions such as $H_3O^+$ or $K^+$ due to the hydrophilicity and ionomeric property of the polymer and therefore high ionic conductivity and low membrane specific area resistance.

Suitable water insoluble hydrophilic ionically conductive polymers include, but are not limited to, a polysaccharide polymer, a cross-linked polysaccharide polymer, a metal ion-complexed polysaccharide polymer, an acid-complexed polysaccharide polymer, a cross-linked polyvinyl alcohol polymer, an acid-complexed polyvinyl alcohol polymer, a metal ion-complexed polyvinyl alcohol polymer, a cross-linked poly(acrylic acid) polymer, a metal ion-complexed poly(acrylic acid) polymer, an acid-complexed poly(acrylic acid) polymer, a cross-linked poly(methacrylic acid), a metal ion-complexed poly(methacrylic acid), an acid-complexed poly(methacrylic acid), or combinations thereof.

Various types of polysaccharide polymers may be used, including, but not limited to, chitosan, sodium alginate, potassium alginate, alginic acid, sodium carrageenan, potassium carrageenan, sodium hyaluronate, potassium hyaluronate, hyaluronic acid, dextran, pullulan, carboxymethyl curdlan, pectic acid, chitin, chondroitin, xanthan gum, pectic acid, or combinations thereof.

In some embodiments, the water insoluble hydrophilic ionically conductive polymer is alginic acid, cross-linked alginic acid, chitosan, cross-linked chitosan, hyaluronic acid, cross-linked hyaluronic acid, or combinations thereof. The cross-linked water insoluble hydrophilic ionically conductive polymer may be formed via any suitable cross-linking method such as a chemical cross-linking method or a physical cross-linking method, or a combination thereof.

In some embodiments, the metal ion complexing agent for the formation of metal ion-complexed hydrophilic ionically conductive polymer is a ferric ion, ferrous ion, silver ion, or vanadium ion.

The new composite proton conductive membrane may comprise a microporous support membrane and the inorganic fillers and the water insoluble ionically conductive polymer are coated on top of the microporous support membrane. The inorganic fillers and the water insoluble ionically conductive polymer may also be present in the micropores of the microporous support membrane. The microporous support membrane should have good thermal stability (stable up to at least 100° C.), high aqueous and organic solution resistance (insoluble in aqueous and organic solutions) under low pH condition (e.g., pH less than 6), high resistance to oxidizing and reducing conditions (insoluble and no performance drop under oxidizing and reducing conditions), high mechanical strength (no dimensional change under the system operation conditions), as well as other factors dictated by the operating conditions for electrochemical energy conversion and storage applications such as water electrolyzers, fuel cells, and redox flow batteries. The microporous support membrane must be compatible with the cell chemistry and meet the mechanical demands of cell stacking or winding assembly operations. The microporous support membrane has high ionic conductivity but low selectivity of charge-carrying ions such as protons, hydrated protons, potassium ions, hydrated potassium ions, sodium ions, hydrated sodium ions, or ammonium ions over the electrolytes such as ferric ions, hydrated ferric ions, ferrous ions, and hydrated ferrous ions.

The polymers suitable for the preparation of the microporous support membrane can be selected from, but not limited to, polyolefins such as polyethylene and polypropylene, polytetrafluoroethylene, fluorinated ethylene propylene, polyvinylidene fluoride, polychlorotrifluoroethylene, Nylon 6, Nylon 6,6, polyacrylonitrile, polyethersulfone, sulfonated polyethersulfone, polysulfone, sulfonated polysulfone, poly(ether ether ketone), sulfonated poly(ether ether ketone), polyester, cellulose acetate, cellulose triacetate, cellulose, phenolic resin, polybenzimidazole, or combinations thereof. These polymers provide a range of properties such as low cost, high stability in water and electrolytes under a wide range of pH, good mechanical stability, and ease of processability for membrane fabrication.

The microporous support membrane can have either a symmetric porous structure or an asymmetric porous structure. The asymmetric microporous support membrane can be formed by a phase inversion membrane fabrication approach followed by direct air drying, or by phase inversion followed by solvent exchange methods. The microporous support membrane also can be fabricated via a dry processing of thermoplastic polyolefins or a wet processing of thermoplastic olefins. The dry processing of thermoplastic polyolefins utilizes extrusion to bring the polymer above its melting point and form it into the desired shape. Subsequent annealing and stretching processes may also be done to increase the crystallinity and orientation and dimension of the micropores. The wet processing of polyolefin separators is done with the aid of a hydrocarbon liquid or low molecular weight oil mixed with the polymer resin or a mixture of the polymer resin and inorganic nanoparticles in the melt phase. The melt mixture is extruded through a die similar to the dry processed separators. The thickness of the microporous support membrane can be in a range of 10-1000 micrometers, or a range of 10-900 micrometers, or a range of 10-800 micrometers, or a range of 10-700 micrometers, or a range of 10-600 micrometers, or a range of 10-500 micrometers, or a range of 20-500 micrometers. The pore size of the microporous membrane can be in a range of 10 nanometers to 50 micrometers, or a range of 50 nanometers to 10 micrometers, or a range of 0.2 micrometers to 1 micrometer.

The coating layer comprising the inorganic fillers and the water insoluble ionically conductive polymer on top of the microporous support membrane is a dense nonporous layer and has a thickness typically in the range of about 1 micrometer to about 100 micrometers, or in the range of about 5 micrometers to about 50 micrometers.

Another aspect of the invention are methods of making the composite proton conductive membrane. In one embodiment, the method comprises the steps of: a) preparing a dispersion of a water insoluble ionically conductive polymer in water, organic solvent, or a water/organic solvent mixture; b) preparing a mixed dispersion comprising the water insoluble ionically conductive polymer and inorganic fillers by adding the inorganic fillers or a dispersion of the inorganic fillers in water, organic solvent, or a water/organic solvent mixture to the dispersion of the water insoluble ionically conductive polymer under stirring and/or sonicating; and c) preparing a composite proton conductive membrane by casting a layer of the mixed dispersion on a nonporous substrate such as a glass plate or a Teflon sheet, followed by drying the layer of the mixed dispersion and detaching the layer from the substrate to form a dense nonporous composite proton conductive membrane.

In some embodiments, the organic solvent is selected from methanol, ethanol, n-propanol, 2-propanol, acetone, acetic acid, or a mixture thereof.

In some embodiments, the inorganic filler has covalently bonded acidic functional groups and a high surface area of at least 150 m$^2$/g, or at least 300 m$^2$/g, or at least 400 m$^2$/g.

In some embodiments, the acidic functional groups are selected from —$H_2PO_3$, —R—$H_2PO_3$, —$SO_3H$, —R—$SO_3H$, —COOH, —R—COOH, —$C_6H_5OH$, —R—$C_6H_5OH$, or a combination thereof, wherein R represents a linear alkyl group, a branched alkyl group, a cycloalkyl group, an organoamino group, an acid group-substituted organoamino group, or an aryl group and the number of carbon atoms in these groups is preferably 1 to 20, more preferably 1 to 10.

In some embodiments, the inorganic filler is aminopropyl-N,N-bis(methyl phosphonic acid)-functionalized silica gel such as SilicaMetS® AMPA, aminopropyl-N,N-bis(methyl phosphonic acid)-functionalized fumed silica, n-propyl phosphonic acid-functionalized silica gel, n-propyl phosphonic acid-functionalized fumed silica, p-toluenesulfonic acid-functionalized silica gel, p-toluenesulfonic acid-functionalized fumed silica, 4-ethylbenzenesulfonic acid-functionalized silica gel such as SilicaBond® Tosic Acid, 4-ethylbenzenesulfonic acid-functionalized fumed silica, n-propyl sulfonic acid-functionalized silica gel, n-propyl sulfonic acid-functionalized fumed silica, or combinations thereof.

In some embodiments, the water insoluble ionically conductive polymer is selected from, a perfluorinated ionomer, a cross-linked perfluorinated cation-exchange polymer, a partially fluorinated cation-exchange polymer, a cross-linked partially fluorinated cation-exchange polymer, a non-fluorinated hydrocarbon cation-exchange polymer, a cross-linked non-fluorinated hydrocarbon cation-exchange polymer, or combinations thereof.

In some embodiments, the water insoluble ionically conductive polymer is Nafion®, Flemion®, Aquivion®, Aciplex®, NEOSEPTA®-F, Fumapem®, BAM®, sulfonated polysulfone, cross-linked sulfonated polysulfone, sulfonated poly(phenylene sulfone), sulfonated phenylated poly(phenylene), sulfonated polystyrene, sulfonated trifluorostyrene-trifluorostyrene copolymer, sulfonated polystyrene-poly(vinylidene fluoride) copolymer, sulfonated polyethersulfone, cross-linked sulfonated polyethersulfone, sulfonated polyether ether ketone, cross-linked sulfonated polyether ether ketone, or combinations thereof.

In some embodiments, the membrane may be dried for a time in a range of 5 min to 72 h, or 1 h to 56 h, or 12 to 52 h, or 10 min to 2 h, or 30 min to 1 h at a temperature in a range of 40° C. to 150° C., or 40° C. to 120° C., or 80° C. to 110° C.

In some embodiments, the thickness of the composite proton conductive membrane is in a range of about 5 micrometer to about 500 micrometers, or in a range of about 20 micrometers to about 300 micrometers, or in a range of about 20 micrometers to about 200 micrometers.

In some embodiments, the inorganic fillers are in the form of particles, fine beads, thin plates, rods, or fibers.

In some embodiments, the size of the inorganic filler is in a range of about 2 nm to about 200 μm, or in a range of about 10 nm to about 100 μm, or in a range of about 50 nm to about 80 m.

In some embodiments, the weight ratio of the inorganic filler to the water insoluble ionically conductive polymer in the composite proton conductive membrane is in a range of 1/400 to 40/100, or in a range of 1/200 to 25/100, or in a range of 1/100 to 10/100.

In some embodiments, the concentration of the water insoluble ionically conductive polymer in the dispersion of the water insoluble ionically conductive polymer in water, organic solvent, or a water/organic solvent mixture is in a range of 5 wt % to 35 wt %, or in a range of 10 wt % to 25 wt %. The organic solvent is selected from methanol, ethanol, n-propanol, 2-propanol, acetone, acetic acid, or a mixture thereof. In another embodiment, the method comprises the steps of: a) preparing a dispersion of a water insoluble ionically conductive polymer in water, organic solvent, or a water/organic solvent mixture; b) preparing a mixed dispersion comprising the water insoluble ionically conductive polymer and inorganic fillers by adding the inorganic fillers or a dispersion of the inorganic fillers in water, organic solvent, or a water/organic solvent mixture to the dispersion of the water insoluble ionically conductive polymer under stirring and/or sonicating; and c) preparing a composite proton conductive membrane by casting a layer of the mixed dispersion on a microporous support membrane, followed by drying the composite proton conductive membrane comprising a dense nonporous layer having the inorganic fillers and water insoluble ionically conductive polymer and a microporous support membrane layer.

In some embodiments, the inorganic filler has covalently bonded acidic functional groups and a high surface area of at least 150 m$^2$/g, or at least 300 m$^2$/g, or at least 400 m$^2$/g.

In some embodiments, the acidic functional groups are selected from —$H_2PO_3$, —R—$H_2PO_3$, —$SO_3H$, —R—$SO_3H$, —COOH, —R—COOH, —$C_6H_5OH$, —R—$C_6H_5OH$, or a combination thereof, wherein R represents a linear alkyl group, a branched alkyl group, a cycloalkyl group, an organoamino group, an acid group-substituted organoamino group, or an aryl group and the number of carbon atoms in these groups is preferably 1 to 20, more preferably 1 to 10.

In some embodiments, the inorganic filler is aminopropyl-N,N-bis(methyl phosphonic acid)-functionalized silica gel such as SilicaMetS® AMPA, aminopropyl-N,N-bis(methyl phosphonic acid)-functionalized fumed silica, n-propyl phosphonic acid-functionalized silica gel, n-propyl phosphonic acid-functionalized fumed silica, p-toluenesulfonic acid-functionalized silica gel, p-toluenesulfonic acid-functionalized fumed silica, 4-ethylbenzenesulfonic acid-functionalized silica gel such as SilicaBond® Tosic Acid, 4-ethylbenzenesulfonic acid-functionalized fumed silica, n-propyl sulfonic acid-functionalized silica gel, n-propyl sulfonic acid-functionalized fumed silica, or combinations thereof.

In some embodiments, the water insoluble ionically conductive polymer is selected from, a perfluorinated ionomer, a cross-linked perfluorinated cation-exchange polymer, a partially fluorinated cation-exchange polymer, a cross-linked partially fluorinated cation-exchange polymer, a non-fluorinated hydrocarbon cation-exchange polymer, a cross-linked non-fluorinated hydrocarbon cation-exchange polymer, or combinations thereof.

In some embodiments, the water insoluble ionically conductive polymer is Nafion®, Flemion®, Aquivion®, Aciplex®, NEOSEPTA®-F, Fumapem®, BAM®, sulfonated polysulfone, cross-linked sulfonated polysulfone, sulfonated poly(phenylene sulfone), sulfonated phenylated poly(phenylene), sulfonated polystyrene, sulfonated trifluorostyrene-trifluorostyrene copolymer, sulfonated polystyrene-poly(vinylidene fluoride) copolymer, sulfonated polyethersulfone, cross-linked sulfonated polyethersulfone, sulfonated polyether ether ketone, cross-linked sulfonated polyether ether ketone, or combinations thereof.

In some embodiments, the microporous support membrane comprises a polyethylene, a polypropylene, a polytetrafluoroethylene, a fluorinated ethylene propylene, a polyvinylidene fluoride, a polychlorotrifluoroethylene, a Nylon 6, a Nylon 6,6, a polyacrylonitrile, a polyethersulfone, a sulfonated polyethersulfone, a polysulfone, a sulfonated polysulfone, a poly(ether ether ketone), a sulfonated poly(ether ether ketone), a polyester, a cellulose acetate, a cellulose triacetate, a cellulose, a phenolic resin, a polybenzimidazole, or combinations thereof.

In some embodiments, the membrane may be dried for a time in a range of 5 min to 72 h, or 1 h to 56 h, or 12 to 52 h, or 10 min to 2 h, or 30 min to 1 h at a temperature in a range of 40° C. to 150° C., or 40° C. to 120° C., or 80° C. to 110° C.

In some embodiments, the coating layer comprising the inorganic fillers and the water insoluble ionically conductive polymer on top of the microporous support membrane has a thickness in the range of about 1 micrometer to about 100 micrometers, or in the range of about 5 micrometers to about 50 micrometers.

In some embodiments, the inorganic fillers are in the form of particles, fine beads, thin plates, rods, or fibers.

In some embodiments, the size of the inorganic filler is in a range of about 2 nm to about 200 μm, or in a range of about 10 nm to about 100 μm, or in a range of about 50 nm to about 80 m.

In some embodiments, the weight ratio of the inorganic filler to the water insoluble ionically conductive polymer in the composite proton conductive membrane is in a range of 1/400 to 40/100, or in a range of 1/200 to 25/100, or in a range of 1/100 to 10/100.

In yet another embodiment, the method comprises the steps of: a) preparing a homogeneous solution of a water soluble hydrophilic ionically conductive polymer in water or a water/organic solvent mixture; b) preparing a dispersion comprising the water soluble hydrophilic ionically conductive polymer and dispersed inorganic fillers by adding the inorganic fillers or a dispersion of the inorganic fillers in water or a water/organic solvent mixture to the solution of the water soluble hydrophilic ionically conductive polymer under stirring and/or sonicating; c) casting a layer of the dispersion comprising the water soluble hydrophilic ionically conductive polymer and the dispersed inorganic fillers on a microporous support membrane, followed by drying the layer of the dispersion; and d) preparing a composite proton conductive membrane by converting the water soluble hydrophilic ionically conductive polymer in the dried coating layer to water insoluble ionically conductive polymer to form the composite proton conductive membrane comprising a dense nonporous layer having the inorganic fillers and water insoluble ionically conductive polymer and a microporous support membrane layer.

In some embodiments, the inorganic filler has covalently bonded acidic functional groups and a high surface area of at least 150 $m^2/g$, or at least 300 $m^2/g$, or at least 400 $m^2/g$.

In some embodiments, the acidic functional groups are selected from —$H_2PO_3$, —R—$H_2PO_3$, —$SO_3H$, —R—$SO_3H$, —COOH, —R—COOH, —$C_6H_5OH$, —R—$C_6H_5OH$, or a combination thereof, wherein R represents a linear alkyl group, a branched alkyl group, a cycloalkyl group, an organoamino group, an acid group-substituted organoamino group, or an aryl group and the number of carbon atoms in these groups is preferably 1 to 20, more preferably 1 to 10.

In some embodiments, the inorganic filler is aminopropyl-N,N-bis(methyl phosphonic acid)-functionalized silica gel such as SilicaMetS® AMPA, aminopropyl-N,N-bis(methyl phosphonic acid)-functionalized fumed silica, n-propyl phosphonic acid-functionalized silica gel, n-propyl phosphonic acid-functionalized fumed silica, p-toluenesulfonic acid-functionalized silica gel, p-toluenesulfonic acid-functionalized fumed silica, 4-ethylbenzenesulfonic acid-functionalized silica gel such as SilicaBond® Tosic Acid, 4-ethylbenzenesulfonic acid-functionalized fumed silica, n-propyl sulfonic acid-functionalized silica gel, n-propyl sulfonic acid-functionalized fumed silica, or combinations thereof.

In some embodiments, the water soluble hydrophilic ionically conductive polymer comprises a polysaccharide, a polyvinyl alcohol, a poly(acrylic acid), a poly(methacrylic acid), or combinations thereof.

In some embodiments, the polysaccharide polymer comprises chitosan, sodium alginate, potassium alginate, alginic acid, sodium carrageenan, potassium carrageenan, sodium hyaluronate, potassium hyaluronate, hyaluronic acid, dextran, pullulan, carboxymethyl curdlan, pectic acid, chitin, chondroitin, xanthan gum, pectic acid, or combinations thereof.

In some embodiments, the microporous support membrane comprises a polyethylene, a polypropylene, a polytetrafluoroethylene, fluorinated ethylene propylene, a polyvinylidene fluoride, a polychlorotrifluoroethylene, a Nylon 6, a Nylon 6,6, a polyacrylonitrile, a polyethersulfone, a sulfonated polyethersulfone, a polysulfone, a sulfonated polysulfone, a poly(ether ether ketone), a sulfonated poly(ether ether ketone), a polyester, a cellulose acetate, a cellulose triacetate, a cellulose, a phenolic resin, a polybenzimidazole, or combinations thereof.

In some embodiments, the membrane may be dried for a time in a range of 5 min to 24 h, or 5 min to 5 h, or 5 min to 3 h, or 10 min to 2 h, or 30 min to 1 h at a temperature in a range of 40° C. to 150° C., or 40° C. to 120° C., or 55° C. to 65° C.

In some embodiments, the coating layer comprising the inorganic fillers and the water insoluble ionically conductive polymer on top of the microporous support membrane has a thickness in the range of about 1 micrometer to about 100 micrometers, or in the range of about 5 micrometers to about 50 micrometers.

In some embodiments, the inorganic fillers are in the form of particles, fine beads, thin plates, rods, or fibers.

In some embodiments, the size of the inorganic filler is in a range of about 2 nm to about 200 µm, or in a range of about 10 nm to about 100 µm, or in a range of about 50 nm to about 80 m.

In some embodiments, the weight ratio of the inorganic filler to the water insoluble ionically conductive polymer in the composite proton conductive membrane is in a range of 1/400 to 40/100, or in a range of 1/200 to 25/100, or in a range of 1/100 to 10/100.

In some embodiments, the water soluble hydrophilic ionically conductive polymer is converted to water insoluble ionically conductive polymer by complexing the water soluble hydrophilic ionically conductive polymer using a complexing agent.

In some embodiments, the complexing agent is selected from polyphosphoric acid, boric acid, a metal ion, or combinations thereof.

In some embodiments, the metal ion complexing agent for the formation of metal ion-complexed hydrophilic ionically conductive polymer is ferric ion, ferrous ion, silver ion, or vanadium ion.

In some embodiments, the water soluble hydrophilic ionically conductive polymer is converted to water insoluble ionically conductive polymer by radiation cross-linking the water soluble hydrophilic polymer.

In some embodiments, the water soluble hydrophilic ionically conductive polymer is converted to water insoluble ionically conductive polymer by chemical cross-linking the water soluble hydrophilic ionically conductive polymer using a chemical cross-linking agent.

In some embodiments, the chemical cross-linking agent is selected from glyoxal, glutaraldehyde, sulfosuccinic acid, ethyleneglycoldiglycidyl ether, 1,6-hexamethylenediisocynate, divinyl sulfone, or combinations thereof.

In some embodiments, the homogeneous solution of a water soluble ionically conductive ionically conductive polymer comprises acetic acid or other inorganic or organic acids.

In some embodiments, the water soluble hydrophilic ionically conductive polymer is converted to a water insoluble hydrophilic ionically conductive polymer by immersing the dried membrane in an aqueous solution of polyphosphoric acid, boric acid, metal salt, hydrochloric acid, or combinations thereof.

In some embodiments, the water soluble hydrophilic ionically conductive polymer on the membrane is immersed in an aqueous solution of polyphosphoric acid, boric acid, metal salt, hydrochloric acid, or combinations thereof for a time in a range of 5 min to 24 h, or 5 min to 12 h, or 5 min to 8 h, or 10 min to 5 h, or 30 min to 1 h.

In other embodiments, the water soluble hydrophilic ionically conductive polymer is complexed in situ with a complexing agent in a negative electrolyte, a positive electrolyte, or both the negative electrolyte and the positive electrolyte in a redox flow battery cell.

Another aspect of the invention is a redox flow battery system. In one embodiment, the redox flow battery system comprises: at least one rechargeable cell comprising a positive electrolyte, a negative electrolyte, and a composite proton conductive membrane positioned between the positive electrolyte and the negative electrolyte, the positive electrolyte in contact with a positive electrode, and the negative electrolyte in contact with a negative electrode; wherein the composite proton conductive membrane comprises an inorganic filler having covalently bonded acidic functional groups and a high surface area of at least 150 $m^2/g$, a water insoluble ionically conductive polymer, and optionally a microporous support membrane.

In some embodiments, the acidic functional groups covalently bonded to the inorganic fillers are selected from $-H_2PO_3$, $-R-H_2PO_3$, $-SO_3H$, $-R-SO_3H$, $-COOH$, $-R-COOH$, $-C_6H_5OH$, $-R-C_6H_5OH$, or a combination thereof, wherein R represents a linear alkyl group, a branched alkyl group, a cycloalkyl group, an organoamino group, an acid group-substituted organoamino group, or an aryl group and the number of carbon atoms in these groups is preferably 1 to 20, more preferably 1 to 10.

In some embodiments, the inorganic filler is aminopropyl-N,N-bis(methyl phosphonic acid)-functionalized silica gel such as SilicaMetS® AMPA, aminopropyl-N,N-bis(methyl phosphonic acid)-functionalized fumed silica, n-propyl phosphonic acid-functionalized silica gel, n-propyl phosphonic acid-functionalized fumed silica, p-toluenesulfonic acid-functionalized silica gel, p-toluenesulfonic acid-functionalized fumed silica, 4-ethylbenzenesulfonic acid-functionalized silica gel such as SilicaBond® Tosic Acid, 4-ethylbenzenesulfonic acid-functionalized fumed silica, n-propyl sulfonic acid-functionalized silica gel, n-propyl sulfonic acid-functionalized fumed silica, or combinations thereof.

In some embodiments, the water insoluble ionically conductive polymer is a perfluorinated ionomer, a cross-linked perfluorinated cation-exchange polymer, a partially fluorinated cation-exchange polymer, a cross-linked partially fluorinated cation-exchange polymer, a non-fluorinated hydrocarbon cation-exchange polymer, a cross-linked non-fluorinated hydrocarbon cation-exchange polymer, or combinations thereof.

In some embodiments, the water insoluble ionically conductive polymer is Nafion®, Flemion®, Aquivion®, Aciplex®, NEOSEPTA®-F, Fumapem®, BAM®, sulfonated polysulfone, cross-linked sulfonated polysulfone, sulfonated poly(phenylene sulfone), sulfonated phenylated poly(phenylene), sulfonated polystyrene, sulfonated trifluorostyrene-trifluorostyrene copolymer, sulfonated polystyrene-poly(vinylidene fluoride) copolymer, sulfonated polyethersulfone, cross-linked sulfonated polyethersulfone, sulfonated polyether ether ketone, cross-linked sulfonated polyether ether ketone, or combinations thereof.

In some embodiments, the water insoluble ionically conductive polymer is a polysaccharide polymer, a cross-linked polysaccharide polymer, a metal ion-complexed polysaccharide polymer, an acid-complexed polysaccharide polymer, a cross-linked polyvinyl alcohol polymer, an acid-complexed polyvinyl alcohol polymer, a metal ion-complexed polyvinyl alcohol polymer, a cross-linked poly(acrylic acid) polymer, a metal ion-complexed poly(acrylic acid) polymer, an acid-complexed poly(acrylic acid) polymer, a cross-linked poly(methacrylic acid), a metal ion-complexed poly(methacrylic acid), an acid-complexed poly(methacrylic acid), or combinations thereof.

In some embodiments, the water insoluble ionically conductive polymer is alginic acid, cross-linked alginic acid, chitosan, cross-linked chitosan, hyaluronic acid, cross-linked hyaluronic acid, or combinations thereof.

In some embodiments, the microporous support membrane comprises a polyethylene, a polypropylene, a polytetrafluoroethylene, fluorinated ethylene propylene, a polyvinylidene fluoride, a polychlorotrifluoroethylene, a Nylon 6, a Nylon 6,6, a polyacrylonitrile, a polyethersulfone, a sulfonated polyethersulfone, a polysulfone, a sulfonated polysulfone, a poly(ether ether ketone), a sulfonated poly(ether ether ketone), a polyester, a cellulose acetate, a cellulose triacetate, a cellulose, a phenolic resin, a polybenzimidazole, or combinations thereof.

In some embodiment, the negative electrolyte, the positive electrolyte, or both the negative electrolyte and the positive electrolyte comprises a boric acid additive capable of complexing with the ionically conductive polymer on the composite proton conductive membrane.

In some embodiment, the negative electrolyte, the positive electrolyte, or both the negative electrolyte and the positive electrolyte comprises ferrous chloride.

In some embodiment, the negative electrolyte, the positive electrolyte, or both the negative electrolyte and the positive electrolyte comprises a supporting electrolyte.

In some embodiment, the supporting electrolyte is selected from ammonium chloride, potassium chloride, sodium chloride, or combinations thereof.

In some embodiment, the positive electrolyte comprises ferrous chloride, supporting electrolyte, and hydrochloric acid.

In some embodiment, the negative electrolyte, the positive electrolyte, or both the negative electrolyte and the positive electrolyte comprises glycine.

In some embodiments, the water insoluble ionically conductive polymer is formed in situ by complexing a water soluble ionically conductive polymer with a complexing agent in the negative electrolyte, the positive electrolyte, or both the negative electrolyte and the positive electrolyte.

Yet another aspect of the invention is a membrane electrode assembly. In one embodiment, the membrane electrode assembly comprises: a composite proton conductive membrane; an anode comprising an anode catalyst on one surface of the composite proton conductive membrane; an anode gas diffusion layer; a cathode comprising a cathode catalyst on the other surface of the composite proton conductive membrane; and a cathode gas diffusion layer; wherein the composite proton conductive membrane comprises an inorganic filler having covalently bonded acidic functional groups and a high surface area of at least 150 $m^2/g$, a water insoluble ionically conductive polymer, and optionally a microporous support membrane.

In some embodiments, the acidic functional groups covalently bonded to the inorganic fillers are selected from —$H_2PO_3$, —R—$H_2PO_3$, —$SO_3H$, —R—$SO_3H$, —COOH, —R—COOH, —$C_6H_5OH$, —R—$C_6H_5OH$, or a combination thereof, wherein R represents a linear alkyl group, a branched alkyl group, a cycloalkyl group, an organoamino group, an acid group-substituted organoamino group, or an aryl group and the number of carbon atoms in these groups is preferably 1 to 20, more preferably 1 to 10.

In some embodiments, the inorganic filler is aminopropyl-N,N-bis(methyl phosphonic acid)-functionalized silica gel such as SilicaMetS® AMPA, aminopropyl-N,N-bis(methyl phosphonic acid)-functionalized fumed silica, n-propyl phosphonic acid-functionalized silica gel, n-propyl phosphonic acid-functionalized fumed silica, p-toluenesulfonic acid-functionalized silica gel, p-toluenesulfonic acid-functionalized fumed silica, 4-ethylbenzenesulfonic acid-functionalized silica gel such as SilicaBond® Tosic Acid, 4-ethylbenzenesulfonic acid-functionalized fumed silica, n-propyl sulfonic acid-functionalized silica gel, n-propyl sulfonic acid-functionalized fumed silica, or combinations thereof.

In some embodiments, the water insoluble ionically conductive polymer is a perfluorinated ionomer, a cross-linked perfluorinated cation-exchange polymer, a partially fluorinated cation-exchange polymer, a cross-linked partially fluorinated cation-exchange polymer, a non-fluorinated hydrocarbon cation-exchange polymer, a cross-linked non-fluorinated hydrocarbon cation-exchange polymer, or combinations thereof.

In some embodiments, the water insoluble ionically conductive polymer is Nafion®, Flemion®, Aquivion®, Aciplex®, NEOSEPTA®-F, Fumapem®, BAM®, sulfonated polysulfone, cross-linked sulfonated polysulfone, sulfonated poly(phenylene sulfone), sulfonated phenylated poly(phenylene), sulfonated polystyrene, sulfonated trifluorostyrene-trifluorostyrene copolymer, sulfonated polystyrene-poly(vinylidene fluoride) copolymer, sulfonated polyethersulfone, cross-linked sulfonated polyethersulfone, sulfonated polyether ether ketone, cross-linked sulfonated polyether ether ketone, or combinations thereof.

In some embodiments, the water insoluble ionically conductive polymer is a polysaccharide polymer, a cross-linked polysaccharide polymer, a metal ion-complexed polysaccharide polymer, an acid-complexed polysaccharide polymer, a cross-linked polyvinyl alcohol polymer, an acid-complexed polyvinyl alcohol polymer, a metal ion-complexed polyvinyl alcohol polymer, a cross-linked poly(acrylic acid) polymer, a metal ion-complexed poly(acrylic acid) polymer, an acid-complexed poly(acrylic acid) polymer, a cross-linked poly(methacrylic acid), a metal ion-complexed poly(methacrylic acid), an acid-complexed poly(methacrylic acid), or combinations thereof.

In some embodiments, the water insoluble ionically conductive polymer is alginic acid, cross-linked alginic acid, chitosan, cross-linked chitosan, hyaluronic acid, cross-linked hyaluronic acid, or combinations thereof.

In some embodiments, the microporous support membrane comprises a polyethylene, a polypropylene, a polytetrafluoroethylene, fluorinated ethylene propylene, a polyvinylidene fluoride, a polychlorotrifluoroethylene, a Nylon 6, a Nylon 6,6, a polyacrylonitrile, a polyethersulfone, a sulfonated polyethersulfone, a polysulfone, a sulfonated polysulfone, a poly(ether ether ketone), a sulfonated poly(ether ether ketone), a polyester, a cellulose acetate, a cellulose triacetate, a cellulose, a phenolic resin, a polybenzimidazole, or combinations thereof.

In some embodiments, the anode catalyst comprises metallic iridium, iridium oxide, bimetallic oxide of iridium and a non-noble metal, or combinations thereof.

In some embodiments, the anode catalyst comprises metallic iridium, iridium oxide, iridium ruthenium alloy, alloy of iridium ruthenium oxide, or combinations thereof.

In some embodiments, the cathode catalyst comprises metallic platinum, platinum oxide, or a combination thereof.

In some embodiments, the anode and cathode catalysts comprise a proton conductive ionomer.

In some embodiments, the proton conductive ionomer is selected from a perfluorinated ionomer, a partially fluorinated cation-exchange polymer, a non-fluorinated hydrocarbon cation-exchange polymer, or combinations thereof.

In some embodiments, the water insoluble ionically conductive polymer is Nafion®, Flemion®, Aquivion®, Aciplex®, NEOSEPTA®-F, Fumapem®, BAM®, sulfonated polysulfone, cross-linked sulfonated polysulfone, sulfonated poly(phenylene sulfone), sulfonated phenylated poly(phenylene), sulfonated polystyrene, sulfonated trifluorostyrene-trifluorostyrene copolymer, sulfonated polystyrene-poly(vinylidene fluoride) copolymer, sulfonated polyethersulfone, cross-linked sulfonated polyethersulfone, sulfonated polyether ether ketone, cross-linked sulfonated polyether ether ketone, or combinations thereof.

In some embodiments, the anode and cathode catalysts comprise an inorganic filler having covalently bonded acidic functional groups and a high surface area of at least 150 $m^2/g$, or at least 300 $m^2/g$, or at least 400 $m^2/g$.

EXAMPLES

The following examples are provided to illustrate one or more embodiments of the invention, but the invention is not limited to the specific embodiments described. Numerous variations can be made to the following examples that lie within the scope of the invention.

Comparative Example 1: Preparation of Alginic Acid (AA)/Daramic® Membrane (Abbreviated as AA/Daramic®)

A 6.5 wt % sodium alginate aqueous solution was prepared by dissolving sodium alginate polymer in DI water. One surface of a Daramic® 175 microporous support membrane purchased from Daramic, LLC was coated with a thin layer of the 6.5 wt % sodium alginate aqueous solution and dried at 60° C. for 2 h in an oven to form a thin, nonporous, sodium alginate layer with a thickness of about 15 micrometers on the surface of the Daramic® support membrane. The dried membrane was treated with a 1.0 M hydrochloric acid aqueous solution for 30 min to convert the water-soluble sodium alginate coating layer to a water insoluble alginic acid coating layer.

Example 1: Preparation of SilicaMetS® AMPA-Alginic Acid (AA)/Daramic® Composite Membrane (Abbreviated as AMPA-SiO$_2$-AA/Daramic®)

A dispersion of aminopropyl-N,N-bis(methyl phosphonic acid)-functionalized silica gel with high surface area of 480-550 $m^2/g$ (SilicaMetS® AMPA purchased from Silicycle, abbreviated as AMPA-SiO$_2$) and sodium alginate in water was prepared by adding 0.5 g of AMPA-SiO$_2$ and 10.0 g of sodium alginate to 150.0 mL of DI water and stirring the mixture for 8 h. One surface of a Daramic® 175 microporous support membrane purchased from Daramic, LLC was coated with a thin layer of the dispersion and dried at 60° C. for 2 h in an oven to form a thin, nonporous layer comprising AMPA-SiO$_2$ and sodium alginate with a thickness of about 15 micrometers on the surface of the Daramic® support membrane. The dried membrane was treated with a 1.0 M hydrochloric acid aqueous solution for 30 min to convert the water-soluble sodium alginate coating layer to water insoluble alginic acid.

Example 2: All-Iron Redox Flow Battery Performance Study on AA/Daramic and AMPA-SiO$_2$-AA/Daramic® Membranes The ionic conductivity, number of battery charge/discharge cycles, VE, CE, and EE of the AA/Daramic membrane prepared in Comparative Example 1 and AMPA-SiO$_2$-AA/Daramic® composite membrane prepared in Example 1 were measured using EIS with a BCS-810 battery cycling system (Biologic, FRANCE) at room temperature, and the results were shown in Table 1. It can be seen from Table 1 that the new AMPA-SiO$_2$-AA/Daramic® membrane comprising AMPA-SiO$_2$ inorganic fillers showed lower area specific resistance, longer battery cycles, high CE, and higher EE than the AA/Daramic membrane without AMPA-SiO$_2$ inorganic fillers.

TABLE 1

All-Iron Redox Flow Battery Performance of AA/Daramic and AMPA-SiO$_2$-AA/Daramic ® Membranes[a]

| Membrane | Area Specific Resistance ($\Omega \cdot cm^2$) | # Cycles | VE (%) | CE (%) | EE (%) |
|---|---|---|---|---|---|
| AA/Daramic ® (Comparative Example 1) | 1.51 | 26 | 65.9 | 91.3 | 60.2 |
| AMPA-SiO$_2$-AA/Daramic ® (Example 1) | 1.42 | 32 | 66.1 | 93.8 | 61.9 |

[a]Negative electrolyte solution: 1.5M FeCl$_2$, 3.5M NH$_4$Cl, 0.2M boric acid; positive electrolyte solution: 1.5M FeCl$_2$, 3.5M NH$_4$Cl, 0.4M HCl; charge current density: 30 mA/cm$^2$; charge time: 4 h; discharge current density: 30 mA/cm$^2$; discharge time: 4 h; # of cycles were counted with ≥70% CE.

Example 3: Preparation of SilicaMetS® AMPA/Nafion® Composite Membrane (Abbreviated as AMPA-SiO$_2$/Nafion®)

To prepare the AMPA-SiO$_2$/Nafion® composite membrane, a dispersion comprising aminopropyl-N,N-bis (methyl phosphonic acid)-functionalized silica gel with high surface area of 480-550 $m^2/g$ (SilicaMetS® AMPA purchased from Silicycle, abbreviated as AMPA-SiO$_2$) and Nafion® was prepared by adding AMPA-SiO$_2$ to a Nafion® dispersion D2021 (1100 EW, 20 wt % in alcohol) under sonicating and stirring. The weight ratio of AMPA-SiO$_2$ to Nafion® polymer is 1:20. A thin layer of the dispersion was formed by casting the dispersion on a clean glass plate using a casting knife and dried on a hot plate at 30° C. for 12 h to form AMPA-SiO$_2$/Nafion® membrane. The membrane was further dried at 80° C. for 9 h. The dried membrane was peeled off from the glass plate and further heated at 100° C. for 9 h. The final thickness of the membrane was about 60 μm.

Example 4: Preparation of SilicaBond® Tosic Acid/Nafion® Composite Membrane (Abbreviated as TA-SiO$_2$/Nafion®)

To prepare the TA-SiO$_2$/Nafion® composite membrane, a dispersion comprising 4-ethylbenzenesulfonic acid-functionalized silica (SilicaBond® Tosic Acid purchased from Silicycle, abbreviated as TA-SiO$_2$) and Nafion® was prepared by adding TA-SiO$_2$ to a Nafion® dispersion D2021 (1100 EW, 20 wt % in alcohol) under sonicating and stirring. The weight ratio of TA-SiO$_2$ to Nafion® polymer is 1:20. A thin layer of the dispersion was formed by casting the dispersion on a clean glass plate using a casting knife and dried on a hot plate at 30° C. for 12 h to form TA-SiO$_2$/Nafion® membrane. The membrane was further dried at 80° C. for 9 h. The dried membrane was peeled off from the glass plate and further heated at 100° C. for 9 h. The final thickness of the membrane was about 60 μm.

Example 5: Preparation of a Membrane Electrode Assembly (MEA) Comprising AMPA-SiO$_2$/Nafion® Composite Membrane (Abbreviated as 5AMPA-D2021) for Water Electrolysis A 5AMPA-D2021 MEA comprising AMPA-SiO$_2$/Nafion® composite membrane was prepared by a catalyst coated on gas diffusion layer (CCG) method using $IrO_2$ oxygen evolution reaction (OER) catalyst for the anode and Pt/C hydrogen evolution reaction (HER) catalyst for the cathode. Catalyst inks for spraying were prepared by mixing the catalysts and Nafion® ionomer (5 wt % in alcohol) in DI water and alcohol. The mixture was finely dispersed in an ultrasonication bath. Nafion® ionomer contents in both anode and cathode were controlled to about 30 wt % in the total content of the catalyst and Nafion® ionomer. The Pt/C ink was sprayed onto a carbon paper used as a cathode gas diffusion layer. The Pt loading was 0.3 mg/cm². $IrO_2$ ink was sprayed onto a Pt—Ti felt used as an anode gas diffusion layer). $IrO_2$ loading was 1.0 mg/cm². The AMPA-$SiO_2$/Nafion® composite membrane was sandwiched between the two catalyst coated gas diffusion layers. Then, the testing cell was installed using the 5AMPA-D2021 MEA.

Comparative Example 2: Preparation of a Membrane Electrode Assembly (MEA) Comprising Nafion® 212 Commercial Membrane (Abbreviated as Nafion® 212) for Water Electrolysis A Nafion® 212 MEA comprising Nafion® 212 commercial membrane was prepared by a catalyst coated on gas diffusion layer (CCG) method same as that used in Example 5 except that Nafion® 212 commercial membrane instead of AMPA-$SiO_2$/Nafion® composite membrane was used.

Example 6: Water Electrolysis Performance Evaluation Using 5AMPA-D2021 MEA and Nafion® 212 MEA A PEM water electrolysis test station (Scribner 600 electrolyzer test system) was used to evaluate the water electrolysis performance of 5AMPA-D2021 MEA and Nafion® 212 MEA, respectively, in a single electrolyzer cell with an active membrane area of 5 cm². The test station included an integrated power supply, a potentiostat, an impedance analyzer for electrochemical impedance spectroscopy (EIS) and high-frequency resistance (HFR), and real-time sensors for product flow rate and cross-over monitoring. The testing was conducted at 80-100° C. and at atmospheric pressure. Ultrapure water was supplied to the anode of the MEA with a flow rate of 100 mL/min. The cell went through a pre-conditioning process before the testing. The cell was heated to 60° C. and held for 1 h at 200 mA/cm², 1 h at 1 A/cm², followed by 4 h at 1.7 V. The cell was then heated to 80° C. and held for 1 h at 200 mA/cm² and 1 h at 1 A/cm². These steps were counted together as one conditioning cycle. After the conditioning, the polarization curve was prepared (each datapoint end of 1 min hold). After two conditioning cycles, the polarization results were showed in FIG. 1. 5AMPA-D2021 MEA showed lower polarization voltage than Nafion® 212 MEA, indicating that 5AMPA-D2021 MEA comprising the new AMPA-$SiO_2$/Nafion® composite membrane has higher proton conductivity than Nafion® 212 MEA comprising the commercial Nafion® 212 membrane. FIG. 1 shows water electrolysis performance of 5AMPA-D2021 and Nafion® 212 MEAs at 80° C., atmospheric pressure.

Figure 2:
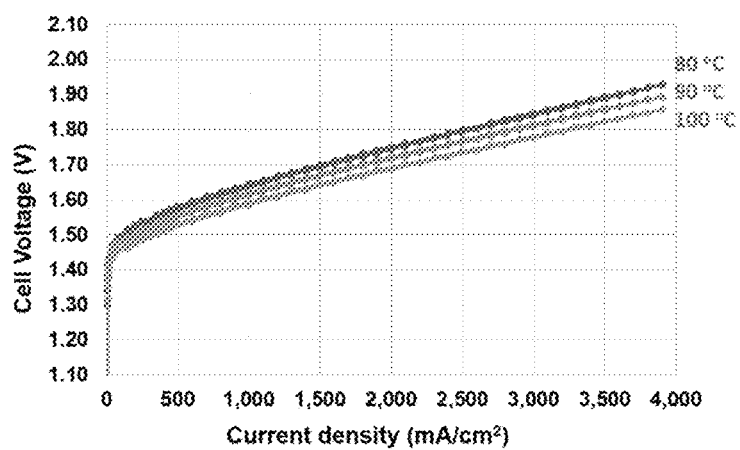
FIG. 2, the polarization voltage for 5AMPA-D2021 MEA decreased with the increase of the operation temperature from 80 to 100° C.

Water electrolyzer operation at higher temperature offers advantages from thermodynamic and kinetic points of view. As shown in FIG. 2, the polarization voltage for 5AMPA-D2021 MEA decreased with the increase of the operation temperature from 80 to 100° C. At 100° C., the current density of the water electrolyzer comprising 5AMPA-D2021 MEA reached 2.7 A/cm² at 1.75 V polarization voltage. FIG. 2 shows the effect of temperature on water electrolysis performance of 5AMPA-D2021 MEA.

Example 7: Preparation of a Membrane Electrode Assembly (MEA) Comprising Catalyst-Coated AMPA-$SiO_2$/Nafion® Composite Membrane (Abbreviated as 5AMPA-D2021-C)

A 5AMPA-D2021-C MEA comprising AMPA-$SiO_2$/Nafion® composite membrane was prepared by a catalyst coated on membrane method using $IrO_2$ oxygen evolution reaction (OER) catalyst for the anode and Pt/C hydrogen evolution reaction (HER) catalyst for the cathode. Catalyst inks for spraying were prepared by mixing the catalysts and Nafion® ionomer (5 wt % in alcohol) in DI water and alcohol. The mixture was finely dispersed in an ultrasonication bath. Nafion® ionomer contents in both anode and cathode were controlled to about 30 wt % in the total content of the catalyst and Nafion® ionomer. The Pt/C ink was sprayed onto one surface of the pre-treated AMPA-$SiO_2$/Nafion® composite membrane. The Pt loading was 0.3 mg/cm². $IrO_2$ ink was sprayed onto the other surface of the pre-treated AMPA-$SiO_2$/Nafion® composite membrane. $IrO_2$ loading was 1.0 mg/cm². The catalyst-coated AMPA-$SiO_2$/Nafion® composite membrane was sandwiched between the carbon paper as a cathode gas diffusion layer and the Pt—Ti felt as an anode gas diffusion layer to form a 5AMPA-D2021-C MEA.

SPECIFIC EMBODIMENTS

While the following is described in conjunction with specific embodiments, it will be understood that this description is intended to illustrate and not limit the scope of the preceding description and the appended claims.

A first embodiment of the invention is a composite proton conductive membrane, comprising an inorganic filler having covalently bonded acidic functional groups and a high surface area of at least 150 m²/g; and a water insoluble ionically conductive polymer. An embodiment of the invention is one, any or all of prior embodiments in this paragraph up through the first embodiment in this paragraph further comprising a microporous support membrane. An embodiment of the invention is one, any or all of prior embodiments in this paragraph up through the first embodiment in this paragraph wherein the inorganic filler is selected from silica gel, precipitated silica, fumed silica, colloidal silica, alumina, silica-alumina, zirconium oxide, a molecular sieve, a metal-organic framework, a zeolitic imidazolate framework, a covalent organic framework, or a combination thereof, wherein the inorganic filler comprises covalently bonded acidic functional groups. An embodiment of the invention is one, any or all of prior embodiments in this paragraph up through the first embodiment in this paragraph wherein the acidic functional groups are selected from —$H_2PO_3$, —R—$H_2PO_3$, —$SO_3H$, —R—$SO_3H$, —COOH, —R—COOH, —$C_6H_5OH$, —R—$C_6H_5OH$, or combinations thereof, wherein R represents a linear alkyl group, a branched alkyl group, a cycloalkyl group, an organoamino group, an acid group-substituted organoamino group, or an aryl group and the number of carbon atoms in these groups is in a range of 1 to 20. An embodiment of the invention is one, any or all of prior embodiments in this paragraph up through the first embodiment in this paragraph wherein the inorganic filler is selected from an aminopropyl-N,N-bis(methyl phosphonic acid)-functionalized silica gel, an aminopropyl-N,N-bis(methyl phosphonic acid)-functionalized fumed silica, a n-propyl phosphonic acid-functionalized silica gel, a n-propyl phosphonic acid-functionalized fumed silica, a p-toluenesulfonic acid-functionalized silica gel, a p-toluenesulfonic acid-functionalized fumed silica, a 4-ethylbenzenesulfonic acid-functionalized silica gel, a 4-ethylbenzenesulfonic acid-functionalized fumed silica, a n-propyl sulfonic acid-functionalized silica gel, a n-propyl sulfonic acid-functionalized fumed silica, or combinations thereof. An embodiment of the invention is one, any or all of prior embodiments in this paragraph up through the first embodiment in this paragraph wherein the water insoluble ionically conductive polymer is selected from a perfluorinated cation-exchange polymer, a cross-linked perfluorinated cation-exchange polymer, a partially fluorinated cation-exchange polymer, a cross-linked partially fluorinated cation-exchange polymer, a non-fluorinated hydrocarbon cation-exchange polymer, a cross-linked non-fluorinated hydrocarbon cation-exchange polymer, or combinations thereof. An embodiment of the invention is one, any or all of prior embodiments in this paragraph up through the first embodiment in this paragraph wherein the water insoluble ionically conductive polymer is a water insoluble hydrophilic polymer or a water insoluble hydrophilic polymer complex comprising repeat units of both electrically neutral repeating units and a fraction of ionized functional groups such as $-SO_3^-$, $-COO^-$, $-PO_3^{2-}$, $-PO_3H^-$, $-C_6H_4O^-$, or $-O_4B^-$. An embodiment of the invention is one, any or all of prior embodiments in this paragraph up through the first embodiment in this paragraph wherein the water insoluble hydrophilic polymer complex comprises a water insoluble hydrophilic polymer complexed with a complexing agent selected from a polyphosphoric acid, boric acid, a metal ion, or a mixture thereof. An embodiment of the invention is one, any or all of prior embodiments in this paragraph up through the first embodiment in this paragraph wherein the water insoluble ionically conductive polymer is selected from a polysaccharide polymer, a cross-linked polysaccharide polymer, a metal ion-complexed polysaccharide polymer, an acid-complexed polysaccharide polymer, a cross-linked polyvinyl alcohol polymer, an acid-complexed polyvinyl alcohol polymer, a metal ion-complexed polyvinyl alcohol polymer, a cross-linked poly(acrylic acid) polymer, a metal ion-complexed poly(acrylic acid) polymer, an acid-complexed poly(acrylic acid) polymer, a cross-linked poly(methacrylic acid), a metal ion-complexed poly(methacrylic acid), an acid-complexed poly(methacrylic acid), or combinations thereof. An embodiment of the invention is one, any or all of prior embodiments in this paragraph up through the first embodiment in this paragraph wherein the polysaccharide polymer is selected from alginic acid, cross-linked alginic acid, chitosan, cross-linked chitosan, hyaluronic acid, cross-linked hyaluronic acid, or combinations thereof. An embodiment of the invention is one, any or all of prior embodiments in this paragraph up through the first embodiment in this paragraph wherein the metal ion complexing agent for the formation of metal ion-complexed hydrophilic ionically conductive polymer is a ferric ion, ferrous ion, silver ion, or vanadium ion. An embodiment of the invention is one, any or all of prior embodiments in this paragraph up through the first embodiment in this paragraph wherein the microporous support membrane is prepared from a polymer selected from polyethylene, polypropylene, polytetrafluoroethylene, fluorinated ethylene propylene, polyvinylidene fluoride, polychlorotrifluoroethylene, polycaprolactam, a polymer prepared from hexamethylenediamine and adipic acid, polyacrylonitrile, polyethersulfone, sulfonated polyethersulfone, polysulfone, sulfonated polysulfone, poly(ether ether ketone), sulfonated poly(ether ether ketone), polyester, cellulose acetate, cellulose triacetate, cellulose, phenolic resin, polybenzimidazole, or combinations thereof. An embodiment of the invention is one, any or all of prior embodiments in this paragraph up through the first embodiment in this paragraph wherein the microporous support membrane has a thickness of about 10-1000 micrometers and comprises pores having a pore size in a range of 10 nanometers to 50 micrometers. An embodiment of the invention is one, any or all of prior embodiments in this paragraph up through the first embodiment in this paragraph wherein the microporous support membrane is coated with a coating layer comprising the inorganic fillers and the water insoluble ionically conductive polymer and wherein the coating layer has a thickness of about 1 to 100 micrometers. An embodiment of the invention is one, any or all of prior embodiments in this paragraph up through the first embodiment in this paragraph wherein the inorganic fillers are in a form of particles, fine beads, thin plates, rods or fibers and have a size from about 2 nm to about 80 μm. An embodiment of the invention is one, any or all of prior embodiments in this paragraph up through the first embodiment in this paragraph wherein the weight ratio of the inorganic filler to the water insoluble ionically conductive polymer in the composite proton conductive membrane is in a range of 1/400 to 40/100.

A second embodiment of the invention is a method of making a composite proton conductive membrane comprising preparing a dispersion of a water insoluble ionically conductive polymer in water, organic solvent, or a water/organic solvent mixture; preparing a mixed dispersion comprising the water insoluble ionically conductive polymer and inorganic fillers by adding the inorganic fillers or a dispersion of the inorganic fillers in water, organic solvent, or a water/organic solvent mixture to the dispersion of the water insoluble ionically conductive polymer under stirring and/or sonicating wherein the inorganic fillers have covalently bonded acidic functional groups and a high surface area of at least 150 m$^2$/g; and preparing a composite proton conductive membrane by casting a layer of the mixed dispersion on a nonporous substrate or on a microporous support membrane, followed by drying.

A third embodiment of the invention is a redox flow battery system, comprising at least one rechargeable cell comprising a positive electrolyte, a negative electrolyte, and the composite proton conductive membrane described above wherein the composite proton conductive membrane is positioned between the positive electrolyte and the negative electrolyte, the positive electrolyte in contact with a positive electrode, and the negative electrolyte in contact with a negative electrode.

A fourth embodiment of the invention membrane electrode assembly, comprising:
the composite proton conductive membrane described above; an anode comprising an anode catalyst on one surface of the composite proton conductive membrane;
an anode gas diffusion layer; a cathode comprising a cathode catalyst on the other surface of the composite proton conductive membrane; and
a cathode gas diffusion layer; wherein the composite proton conductive membrane comprises:
an inorganic filler having covalently bonded acidic functional groups and a high surface area of at least 150 m$^2$/g; and a water insoluble ionically conductive polymer.

What is claimed is:

1. A composite proton conductive membrane, comprising:
an inorganic filler having covalently bonded acidic functional groups and a high surface area of at least 150 $m^2/g$;
a water insoluble ionically conductive polymer; and
a microporous support membrane, wherein the inorganic filler is selected from the group consisting of a metal-organic framework, a zeolitic imidazolate framework, a covalent organic framework and a combination thereof; and
wherein the water insoluble ionically conductive polymer is selected from a group consisting of a polysaccharide polymer, a cross-linked polysaccharide polymer, a metal ion-complexed polysaccharide polymer, an acid-complexed polysaccharide polymer, a cross-linked poly(acrylic acid) polymer, a metal ion-complexed poly(acrylic acid) polymer, an acid-complexed poly(acrylic acid) polymer, a cross-linked poly(methacrylic acid), a metal ion-complexed poly(methacrylic acid), an acid-complexed poly(methacrylic acid), and combinations thereof.

2. The composite proton conductive membrane of claim 1 wherein the acidic functional groups are selected from the group consisting of —H2PO3, —R—H2PO3, —SO3H, —R—SO3H, —COOH, —R—COOH, —C6H5OH, —R—C6H5OH, and combinations thereof, wherein R represents a linear alkyl group, a branched alkyl group, a cycloalkyl group, an organoamino group, an acid group-substituted organoamino group, or an aryl group and the number of carbon atoms in these groups is in a range of 1 to 20.

3. The composite proton conductive membrane of claim 1 wherein said water insoluble hydrophilic polymer is complexed with a complexing agent selected from a polyphosphoric acid, boric acid, a metal ion, or a mixture thereof.

4. The composite proton conductive membrane of claim 1 wherein said polysaccharide polymer is selected from the group consisting of alginic acid, cross linked alginic acid, chitosan, cross-linked chitosan, hyaluronic acid, cross-linked hyaluronic acid, and combinations thereof.

5. The composite proton conductive membrane of claim 3 wherein said metal ion complexing agent for the formation of metal ion-complexed hydrophilic ionically conductive polymer is a ferric ion, ferrous ion, silver ion, or vanadium ion.

6. The composite proton conductive membrane of claim 1 wherein said microporous support membrane is prepared from the group consisting of a polymer selected from polyethylene, polypropylene, polytetrafluoroethylene, fluorinated ethylene propylene, polyvinylidene fluoride, polychlorotrifluoroethylene, polycaprolactam, a polymer prepared from hexamethylenediamine and adipic acid, polyacrylonitrile, polyethersulfone, sulfonated polyethersulfone, polysulfone, sulfonated polysulfone, poly(ether ether ketone), sulfonated poly(ether ether ketone), polyester, cellulose acetate, cellulose triacetate, cellulose, phenolic resin, polybenzimidazole, and combinations thereof.

7. The composite proton conductive membrane of claim 1 wherein said microporous support membrane has a thickness of about 10-1000 micrometers and comprises pores having a pore size in a range of 10 nanometers to 50 micrometers.

8. The composite proton conductive membrane of claim 1 wherein said microporous support membrane is coated with a coating layer comprising the inorganic fillers and the water insoluble ionically conductive polymer and wherein said coating layer has a thickness of about 1 to 100 micrometers.

9. The composite proton conductive membrane of claim 1 wherein said inorganic fillers are in a form of particles, fine beads, thin plates, rods or fibers and have a size from about 2 nm to about 80 μm.

10. The composite proton conductive membrane of claim 1 wherein the weight ratio of the inorganic filler to the water insoluble ionically conductive polymer in the composite proton conductive membrane is in a range of 1/400 to 40/100.

11. The method of making a composite proton conductive membrane comprising of claim 1
a. preparing a dispersion of a water insoluble ionically conductive polymer in water, organic solvent, or a water/organic solvent mixture;
b. preparing a mixed dispersion comprising the water insoluble ionically conductive polymer and inorganic fillers by adding the inorganic fillers or a dispersion of the inorganic fillers in water, organic solvent, or a water/organic solvent mixture to the dispersion of the water insoluble ionically conductive polymer under stirring and/or sonicating wherein said inorganic fillers have covalently bonded acidic functional groups and a high surface area of at least 150 $m^2/g$; and
c. preparing a composite proton conductive membrane by casting a layer of the mixed dispersion on a nonporous substrate or on a microporous support membrane, followed by drying;
wherein the inorganic filler is selected from a metal-organic framework, a zeolitic imidazolate framework, a covalent organic framework and a combination thereof; and wherein the water insoluble ionically conductive polymer is selected from a group consisting of a polysaccharide polymer, a cross-linked polysaccharide polymer, a metal ion-complexed polysaccharide polymer, an acid-complexed polysaccharide polymer, a cross-linked poly(acrylic acid) polymer, a metal ion-complexed poly(acrylic acid) polymer, an acid-complexed poly(acrylic acid) polymer, a cross-linked poly(methacrylic acid), a metal ion-complexed poly(methacrylic acid), an acid-complexed poly(methacrylic acid), and combinations thereof.

12. A redox flow battery system, comprising:
at least one rechargeable cell comprising a positive electrolyte, a negative electrolyte, and the composite proton conductive membrane of claim 1 wherein said composite proton conductive membrane is positioned between the positive electrolyte and the negative electrolyte, the positive electrolyte in contact with a positive electrode, and the negative electrolyte in contact with a negative electrode.

13. A membrane electrode assembly, comprising:
the composite proton conductive membrane of claim 1;
an anode comprising an anode catalyst on one surface of the composite proton conductive membrane;
an anode gas diffusion layer;
a cathode comprising a cathode catalyst on the other surface of the composite proton conductive membrane; and
a cathode gas diffusion layer;
wherein the composite proton conductive membrane comprises:
an inorganic filler having covalently bonded acidic functional groups and a high surface area of at least 150 $m^2/g$;

a water insoluble ionically conductive polymer and;

a microporous membrane, wherein the inorganic filler is selected from a metal organic framework, a zeolitic imidazolate framework, a covalent organic framework and a combination thereof; and wherein the water insoluble ionically conductive polymer is selected from a group consisting of a polysaccharide polymer, a cross-linked polysaccharide polymer, a metal ion-complexed polysaccharide polymer, an acid-complexed polysaccharide polymer, a cross-linked poly(acrylic acid) polymer, a metal ion-complexed poly(acrylic acid) polymer, an acid-complexed poly(acrylic acid) polymer, a cross-linked poly(methacrylic acid), a metal ion-complexed poly(methacrylic acid), an acid-complexed poly(methacrylic acid), and combinations thereof.

* * * * *